United States Patent
Sanz Martinez et al.

(10) Patent No.: US 11,433,990 B2
(45) Date of Patent: Sep. 6, 2022

(54) ACTIVE LAMINAR FLOW CONTROL SYSTEM WITH COMPOSITE PANEL

(71) Applicant: Rohr, Inc., Chula Vista, CA (US)

(72) Inventors: Pablo T. Sanz Martinez, San Diego, CA (US); Johann S. Schrell, San Diego, CA (US); Thomas Paolini, Santee, CA (US)

(73) Assignee: Rohr, Inc.

( * ) Notice: Subject to any disclaimer, the term of this patent is extended or adjusted under 35 U.S.C. 154(b) by 1049 days.

(21) Appl. No.: 16/030,351

(22) Filed: Jul. 9, 2018

(65) Prior Publication Data
US 2020/0010175 A1  Jan. 9, 2020

(51) Int. Cl.
| | |
|---|---|
| *B64C 21/06* | (2006.01) |
| *B64D 29/00* | (2006.01) |
| *F02C 7/045* | (2006.01) |
| *B64C 1/12* | (2006.01) |
| *F15D 1/12* | (2006.01) |

(52) U.S. Cl.
CPC ............. *B64C 21/06* (2013.01); *B64D 29/00* (2013.01); *F02C 7/045* (2013.01); *B64C 1/12* (2013.01); *B64C 2230/22* (2013.01); *F05D 2210/34* (2013.01); *F05D 2240/14* (2013.01); *F15D 1/12* (2013.01)

(58) Field of Classification Search
CPC ....... B64C 1/12; B64C 21/06; B64C 2230/22; B64D 29/00
See application file for complete search history.

(56) References Cited

U.S. PATENT DOCUMENTS

| | | |
|---|---|---|
| 2,326,430 A | 8/1943 | Blanchard et al. |
| 2,742,247 A | 4/1956 | Victor et al. |
| 2,833,492 A | 5/1958 | Fowler et al. |
| 2,867,392 A | 1/1959 | Lear et al. |
| 3,128,973 A | 4/1964 | Dannenberg |
| 3,203,648 A | 8/1965 | Aram et al. |
| 3,521,837 A | 7/1970 | Papst et al. |
| 3,612,446 A | 10/1971 | Lebert et al. |
| 3,879,941 A | 4/1975 | Sargisson |
| 4,258,889 A | 3/1981 | Hunt |
| 4,749,150 A | 6/1988 | Rose et al. |
| 4,802,642 A | 2/1989 | Mangiarotty |

(Continued)

FOREIGN PATENT DOCUMENTS

| | | |
|---|---|---|
| DE | 102007023151 A1 | 11/2008 |
| EP | 0536874 A1 | 11/2008 |

(Continued)

OTHER PUBLICATIONS

EP search report for EP19185346.4 dated Dec. 18, 2019.

(Continued)

*Primary Examiner* — Philip J Bonzell
*Assistant Examiner* — Michael B. Kreiner
(74) *Attorney, Agent, or Firm* — Getz Balich LLC (57) ABSTRACT

An assembly is provided for active laminar flow control. This assembly includes a panel, which panel includes an outer skin, an inner skin and a plurality of plenums between the outer skin and the inner skin. Each of the plurality of plenums is fluidly coupled with a respective array of perforations through the outer skin. The panel is constructed from fiber-reinforced composite material.

17 Claims, 9 Drawing Sheets

(56) References Cited

U.S. PATENT DOCUMENTS

| | | | |
|---|---|---|---|
| 4,807,831 A | 2/1989 | Brewer et al. | |
| 4,813,631 A | 3/1989 | Gratzer | |
| 4,993,663 A | 2/1991 | Lahti et al. | |
| 5,114,100 A | 5/1992 | Rudolph et al. | |
| 5,114,103 A | 5/1992 | Coffinberry | |
| 5,136,837 A | 8/1992 | Davison | |
| 5,167,387 A | 12/1992 | Hartwich | |
| 5,263,667 A | 11/1993 | Horstman | |
| 5,297,765 A | 3/1994 | Hughes et al. | |
| 5,316,032 A * | 5/1994 | DeCoux | B64C 21/06 137/14 |
| 5,590,854 A | 1/1997 | Shatz | |
| 5,591,511 A | 1/1997 | Yasui | |
| 5,618,363 A | 4/1997 | Mullender et al. | |
| 5,653,836 A | 8/1997 | Mnich et al. | |
| 5,741,456 A | 4/1998 | Ayrton | |
| 5,743,488 A | 4/1998 | Rolston et al. | |
| 5,743,493 A | 4/1998 | McCaughan | |
| 5,758,823 A | 6/1998 | Glezer et al. | |
| 5,772,156 A | 6/1998 | Parikh et al. | |
| 5,779,196 A | 7/1998 | Timar | |
| 5,944,287 A | 8/1999 | Rodgers | |
| 6,059,524 A | 5/2000 | Costa et al. | |
| 6,068,328 A | 5/2000 | Gazdzinski | |
| 6,158,957 A | 12/2000 | Marcin et al. | |
| 6,688,558 B2 | 2/2004 | Breer et al. | |
| 6,743,504 B1 * | 6/2004 | Allen | B29C 70/446 428/362 |
| 6,752,358 B1 | 6/2004 | Williams et al. | |
| 6,920,958 B2 | 7/2005 | Harrison | |
| 7,048,230 B2 | 5/2006 | Meyer | |
| 7,070,391 B2 | 7/2006 | Weisse | |
| 7,172,012 B1 | 2/2007 | Memmen | |
| 7,240,821 B2 | 7/2007 | Talwar | |
| 7,331,421 B2 | 2/2008 | Olsen et al. | |
| 7,334,333 B2 | 2/2008 | Palazzini et al. | |
| 7,340,933 B2 | 3/2008 | Stewart | |
| 7,416,105 B2 | 8/2008 | Pitt et al. | |
| 7,438,527 B2 | 10/2008 | Albert et al. | |
| 7,464,852 B2 | 12/2008 | Waldron et al. | |
| 7,673,832 B2 | 3/2010 | Meister | |
| 7,766,280 B2 | 8/2010 | Cloft et al. | |
| 7,857,257 B2 | 12/2010 | Schwarz | |
| 7,866,609 B2 | 1/2011 | Parikh | |
| 7,870,929 B2 | 1/2011 | Farstad | |
| 7,922,126 B2 | 4/2011 | Meister | |
| 7,967,240 B2 | 6/2011 | Sanders et al. | |
| 8,092,169 B2 | 1/2012 | Cloft et al. | |
| 8,128,037 B2 | 3/2012 | Powell et al. | |
| 8,156,711 B2 * | 4/2012 | Hethcock | B64C 1/068 52/790.1 |
| 8,220,588 B2 * | 7/2012 | Thrash | F01D 21/045 181/292 |
| 8,245,976 B2 | 8/2012 | Sakurai et al. | |
| 8,282,037 B2 | 10/2012 | Jain | |
| 8,292,227 B2 * | 10/2012 | Stuhr | B64C 3/26 244/123.12 |
| 8,484,894 B2 | 7/2013 | Sakurai et al. | |
| 8,528,318 B2 | 9/2013 | Hendricks | |
| 8,567,467 B2 | 10/2013 | Maheshwari et al. | |
| 8,636,252 B2 * | 1/2014 | Pook | B29C 66/532 244/119 |
| 8,657,567 B2 | 2/2014 | Cloft et al. | |
| 8,752,795 B2 | 6/2014 | Stewart, III | |
| 8,763,751 B2 | 7/2014 | Starobinski et al. | |
| 8,777,163 B2 | 7/2014 | Safai et al. | |
| 8,783,624 B2 | 7/2014 | Koppelman et al. | |
| 8,800,915 B2 * | 8/2014 | Gerber | B64C 21/06 244/53 B |
| 8,839,805 B2 | 9/2014 | Zysman et al. | |
| 8,840,979 B2 * | 9/2014 | Cetiner | F16B 5/02 428/119 |
| 8,844,553 B2 | 9/2014 | Zysman et al. | |
| 8,904,348 B2 | 12/2014 | Deffler | |
| 8,959,768 B2 | 2/2015 | Vauchel et al. | |
| 8,968,500 B2 * | 3/2015 | Niermann | B64C 1/068 156/64 |
| 9,003,760 B2 | 4/2015 | Chelin et al. | |
| 9,011,618 B2 * | 4/2015 | Niermann | B05C 11/1021 156/64 |
| 9,272,769 B2 * | 3/2016 | Lin | B64C 3/26 |
| 9,487,288 B2 * | 11/2016 | Rupp | B64C 21/06 |
| 9,663,238 B2 * | 5/2017 | Kane | B64D 33/02 |
| 9,704,467 B1 | 7/2017 | Nampy | |
| 9,758,240 B2 | 9/2017 | Brown | |
| 9,764,818 B2 * | 9/2017 | Nampy | B64C 1/066 |
| 9,845,728 B2 | 12/2017 | Brown et al. | |
| 9,874,228 B2 * | 1/2018 | Brown | B64D 29/00 |
| 9,908,620 B2 | 3/2018 | Brown et al. | |
| 10,000,277 B2 | 6/2018 | Tiwari et al. | |
| 10,005,545 B2 * | 6/2018 | Aiderman | B64C 21/06 |
| 10,377,464 B2 * | 8/2019 | Cebolla Garrofe | B29C 45/14475 |
| 10,414,481 B2 * | 9/2019 | Pierick | B64C 3/182 |
| 10,532,807 B2 * | 1/2020 | Garcia Nieto | B64C 3/182 |
| 10,556,670 B2 * | 2/2020 | Koppelman | B64C 3/26 |
| 10,618,636 B2 * | 4/2020 | Mehring | B64D 13/08 |
| 10,676,171 B2 * | 6/2020 | Narayanan Nampy | B64C 1/40 |
| 10,906,659 B2 * | 2/2021 | Gurvich | G10K 11/172 |
| 2001/0022152 A1 | 9/2001 | Takahashi | |
| 2002/0066768 A1 | 6/2002 | Foster et al. | |
| 2002/0139899 A1 | 10/2002 | Porte | |
| 2002/0153361 A1 | 10/2002 | Sakamoto et al. | |
| 2003/0042657 A1 | 3/2003 | Dublineau et al. | |
| 2003/0075300 A1 | 4/2003 | Shah et al. | |
| 2004/0020629 A1 | 2/2004 | Shah et al. | |
| 2004/0144831 A1 | 7/2004 | Odajima et al. | |
| 2005/0045774 A1 | 3/2005 | Hocking | |
| 2005/0121167 A1 | 6/2005 | Marcin, Jr. et al. | |
| 2005/0151026 A1 | 7/2005 | Meyer | |
| 2005/0211408 A1 | 9/2005 | Bullied et al. | |
| 2005/0254955 A1 | 11/2005 | Helder et al. | |
| 2005/0274482 A1 | 12/2005 | Marcin, Jr. et al. | |
| 2006/0021730 A1 | 2/2006 | Marcin | |
| 2007/0074839 A1 | 4/2007 | Turkington et al. | |
| 2007/0095501 A1 | 5/2007 | Beals et al. | |
| 2008/0011445 A1 | 1/2008 | Beals et al. | |
| 2008/0112796 A1 | 5/2008 | Coney et al. | |
| 2008/0169270 A1 | 7/2008 | Parkos et al. | |
| 2008/0256788 A1 * | 10/2008 | Glazebrook | B64F 5/10 29/700 |
| 2008/0308610 A1 | 12/2008 | Watson et al. | |
| 2008/0311421 A1 | 12/2008 | Watson et al. | |
| 2009/0045009 A1 | 2/2009 | Chiou et al. | |
| 2009/0154775 A1 * | 6/2009 | Lea | B29C 70/38 382/108 |
| 2009/0212165 A1 | 8/2009 | Parikh | |
| 2009/0266937 A1 | 10/2009 | Frankenberger et al. | |
| 2010/0294892 A1 | 11/2010 | Syassen | |
| 2012/0070686 A1 | 3/2012 | Ren | |
| 2012/0126062 A1 | 5/2012 | Stewart | |
| 2012/0187252 A1 | 7/2012 | Gerber | |
| 2013/0240609 A1 | 9/2013 | Sanders et al. | |
| 2013/0313391 A1 * | 11/2013 | Fonseka | B64C 1/064 248/228.1 |
| 2014/0147269 A1 | 5/2014 | Porte et al. | |
| 2015/0306815 A1 | 10/2015 | Braden et al. | |
| 2015/0314850 A1 | 11/2015 | Lumbab et al. | |
| 2016/0137291 A1 | 5/2016 | Brown | |
| 2016/0144949 A1 | 5/2016 | Kestler et al. | |
| 2016/0153287 A1 | 6/2016 | Roach et al. | |
| 2016/0159488 A1 | 6/2016 | Roach et al. | |
| 2016/0160863 A1 | 6/2016 | Roach et al. | |
| 2016/0160869 A1 | 6/2016 | Roach et al. | |
| 2016/0169012 A1 | 6/2016 | DaCunha et al. | |
| 2016/0251085 A1 | 9/2016 | Stark | |
| 2016/0311520 A1 | 10/2016 | Khidekel | |
| 2016/0332724 A1 | 11/2016 | Mehring | |
| 2016/0375988 A1 | 12/2016 | Brown et al. | |
| 2016/0377090 A1 | 12/2016 | Brown et al. | |
| 2017/0081020 A1 * | 3/2017 | Pujar | B64D 33/02 |
| 2017/0259902 A1 * | 9/2017 | Cebolla Garrofe | B64C 3/185 |
| 2017/0274577 A1 * | 9/2017 | Burns | B29C 70/443 |

(56) References Cited

U.S. PATENT DOCUMENTS

| 2018/0142622 | A1  | 5/2018 | Biset |
| 2018/0229423 | A1* | 8/2018 | Thai ........................ B29C 63/22 |
| 2019/0112066 | A1* | 4/2019 | Alonso-Miralles .... B64D 29/00 |
| 2019/0202566 | A1* | 7/2019 | Heck ......................... B64C 3/28 |

FOREIGN PATENT DOCUMENTS

| EP | 2687439 A1 | 1/2014 |
| EP | 3159259 B1 | 2/2019 |
| FR | 2943317 A1 | 9/2010 |
| JP | 10230375 | 9/1998 |
| WO | 0100488 | 1/2001 |
| WO | 2011039285 | 4/2011 |

OTHER PUBLICATIONS

Boehm "New Engineering Processes in Aircraft Construction: Application of Laser-Beam and Friction Stir Welding", Glass Physics and Chemistry, vol. 31, No. 1, Jan. 1, 2005, pp. 27-29.

Joslin, "Overview of Laminar Flow Control", Oct. 1998, NASA/TP-1998-208705.

Joslin, "Aircraft Laminar Flow Control", Annual Review of Fluid Mechanics, 1998: vol. 31: 1-29.

Washburn, "Drag Reduction Status and Plans—Laminar Flow and AFC", Jan. 4-7, 2011, AIAA Aero Sciences Meeting.

European Commission, "Hybrid Laminar Flow Technology (HYLTEC)", Jan. 1, 1998.

John E. Green, "Laminar Flow Control—Back to the Future?", 38th Fluid Dynamics Conference and Exhibit, Jun. 23-26, 2008, AIAA 2008-3738.

Chambers, "Innovation in Flight", NASA SP-2005-4539, Aug. 22, 2005.

Braslow, "A History of Suction-Type Laminar-Flow Control with Emphasis on Flight Research", Monographs in Aerospace History #13, 1999.

MacManus et al.; Micro-scale three-dimensional Navier-Stokes investigation of laminar flow control suction hole configurations; Jan. 1996; American Institute of Aeronautics and Astronautics, Inc.; AIAA Paper 96/0544.

Jason Paur, "Boeing Adds Tiny Holes to its Biggest Plane to Boost Efficiency", Technology, Nov. 20, 2013.

Pulley et al. "NASA X Future Forward—ERA", www.nasa.gov/nasax/nasa-x-future-forward-era/, May 29, 2014.

Steve Wilhelm, "Powerwash Gets the Bugs Off Boeing's Secret 787-9 Laminar Flow System", Puget Sound Business Journal, May 7, 2014.

Steve Wilhelm, "How Could 777x Gain Efficiency Edge? Top Exec Hints at Tiny Air Holes in Rear Vertical Fin", Puget Sound Business Journal, Mar. 17, 2014.

\* cited by examiner

ACTIVE LAMINAR FLOW CONTROL SYSTEM WITH COMPOSITE PANEL

BACKGROUND

1. Technical Field

This disclosure relates generally to an aircraft system and, more particularly, to an active laminar flow control system and components thereof.

2. Background Information

It is generally known that laminar flow over an aerodynamic surface, such as an outer surface of a nacelle of an aircraft propulsion system, reduces drag compared to turbulent flow over the same surface. To promote such laminar flow, various active laminar flow control (ALFC) systems have been conceptually developed. Such an ALFC system may include a plenum duct positioned at least partly inside of the nacelle. This plenum duct is fluidly coupled with perforations in the outer surface. The plenum duct is also fluidly coupled with a suction device, which draws air into the plenum duct through the perforations in the outer surface in order to modify airflow over the outer surface. This modification generally removes low energy air from a boundary layer along an extent of the outer surface to prevent that boundary layer from thickening and eventually tripping into a turbulent flow.

While ALFC systems have various known advantages, these systems are typically difficult to commercially implement due to various deficiencies. There is a need in the art therefore for improved active laminar flow control (ALFC) systems and method for manufacturing such systems.

SUMMARY OF THE DISCLOSURE

According to an aspect of the present disclosure, an assembly is provided for active laminar flow control. This assembly includes a panel, which panel includes an outer skin, an inner skin and a plurality of plenums between the outer skin and the inner skin. Each of the plurality of plenums is fluidly coupled with a respective array of perforations through the outer skin. The panel is constructed from fiber-reinforced composite material.

According to another aspect of the present disclosure, another assembly is provided for active laminar flow control. This assembly includes a fiber-reinforced composite panel, which panel includes a radial outer skin, a radial inner skin and a corrugated core forming a plurality of plenums between the radial outer skin and the radial inner skin. Each of the plurality of plenums is fluidly coupled with a respective array of perforations through the radial outer skin.

According to still another aspect of the present disclosure, a manufacturing method is provided during which a panel for an active laminar flow control system is formed from composite material. The panel includes an outer skin, and inner skin and a plurality of plenums between the outer skin and the inner skin. Each of the plurality of plenums is fluidly coupled with a respective array of perforations through the outer skin.

The forming may include co-curing an entirety of the panel during a single curing cycle.

The forming may include curing a first composite body; curing a second composite body; and bonding the cured first composite body to the cured second composite body.

The panel may also include a plurality of corrugations that form the plurality of plenums between the outer skin and the inner skin. The cured first composite body may be configured as or otherwise include the outer skin. The cured second composite body may be configured as or otherwise include at least one of the plurality of corrugations.

The first composite body may be configured as or otherwise include the outer skin. The second composite body may include a first corrugation and a second corrugation. The forming may include bonding the first corrugation directly to the outer skin; and bonding the second corrugation indirectly to the outer skin through a spacer.

The assembly may also include a suction system fluidly coupled with one or more of the plurality of plenums.

The panel may be configured from the fiber-reinforced composite material as a monolithic body.

The panel may also include a plurality of corrugations arranged between the outer skin and the inner skin. The plurality of corrugations may form sidewalls of the plurality of plenums.

A first of the plurality of corrugations may include a bridge, a first sidewall, a second sidewall, a first flange and a second flange. The bridge may extend between the first sidewall and the second sidewall. The bridge may be connected to the inner skin. The first sidewall and the second sidewall may each extend between the inner skin and the outer skin. The first flange may project out from the first sidewall and may be connected to the outer skin. The second flange may project out from the second sidewall and may be connected to the outer skin.

A first of the plurality of corrugations may be bonded to at least one of the outer skin and the inner skin.

The panel may also include a spacer. A first of the plurality of corrugations may be connected directly to the outer skin. A second of the plurality of corrugations may be connected indirectly to the outer skin through the spacer.

A first distance between the outer skin and the inner skin at the first of the plurality of corrugations may be equal to a second distance between the outer skin and the inner skin at the second of the plurality of corrugations.

The panel may also include a spacer. A first of the plurality of corrugations may be connected directly to the inner skin. A second of the plurality of corrugations may be connected indirectly to the inner skin through the spacer.

A first portion of the outer skin may have a first thickness. A second portion of the outer skin may have a second thickness that is different from the first thickness.

The assembly may also include a nacelle for an aircraft propulsion system. The nacelle may include the panel.

A suction system may be fluidly coupled with each of the plurality of plenums.

The panel further may also include a plurality of corrugations arranged between the outer skin and the inner skin. The plurality of corrugations may form sidewalls of the plurality of plenums. The panel may be configured from fiber-reinforced composite material as a monolithic body.

The panel may also include a spacer and a plurality of corrugations arranged between the outer skin and the inner skin. The plurality of corrugations may form sidewalls of the plurality of plenums. A first of the plurality of corrugations may be bonded directly to one of the outer skin and the inner skin. A second of the plurality of corrugations may be bonded indirectly to the one of the outer skin and the inner skin through the spacer.

The foregoing features and the operation of the invention will become more apparent in light of the following description and the accompanying drawings.

DETAILED DESCRIPTION

Figure 1:
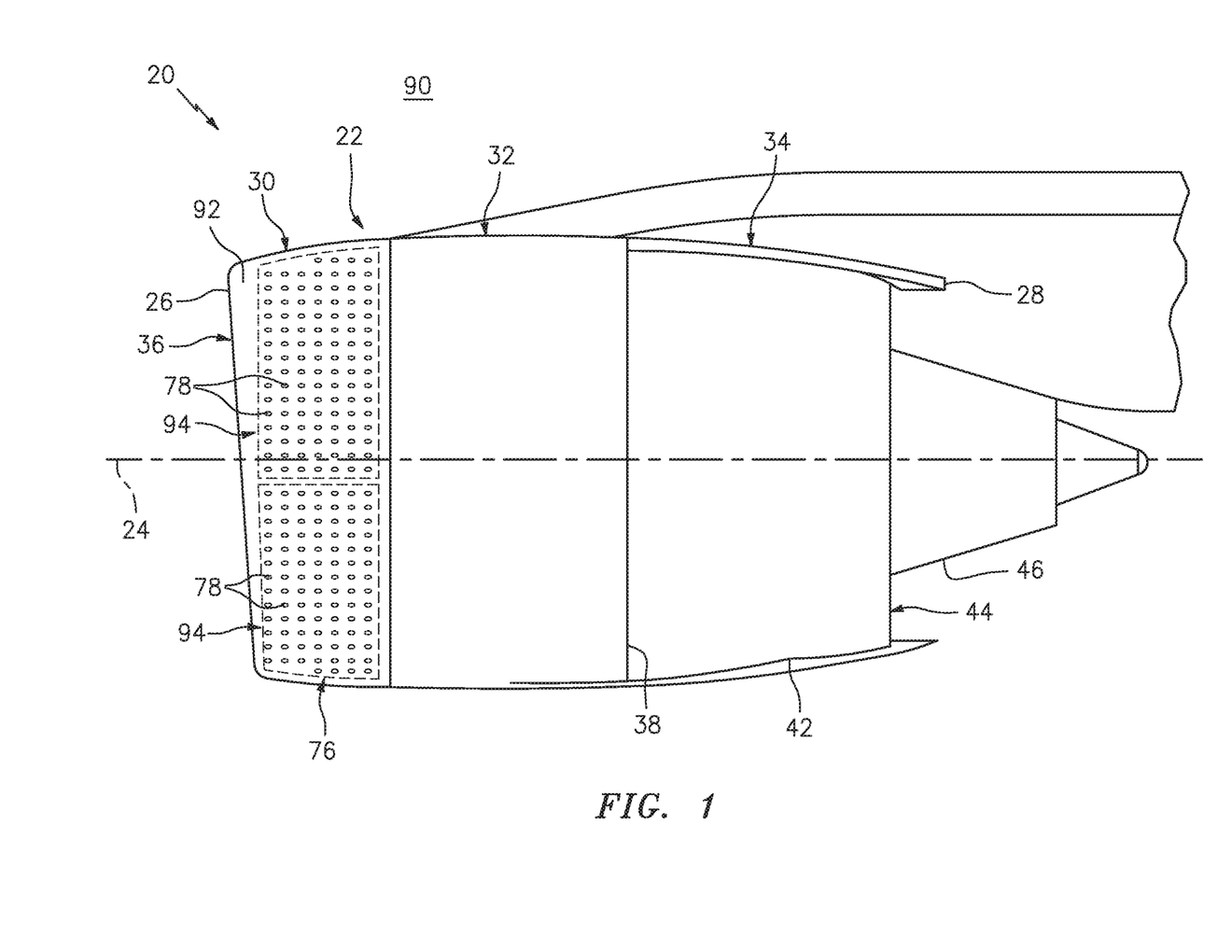
FIG. 1 is a schematic side illustration of an aircraft propulsion system with an active laminar flow control (ALFC) system, in accordance with various embodiments.

FIG. 1 illustrates an aircraft propulsion system 20 for an aircraft such as, but not limited to, a commercial airliner or cargo plane. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. An outer structure of the nacelle 22 extends along an axial centerline 24 between a nacelle forward end 26 and a nacelle aft end 28. The nacelle 22 of FIG. 1 includes a nacelle inlet structure 30, one or more fan cowls 32 (one such cowl visible in FIG. 1) and a nacelle aft structure 34, which may be configured as part of or include a thrust reverser system. However, in other embodiments, the nacelle 22 may be configured without such a thrust reverser system.

Briefly, the inlet structure 30 is disposed at the nacelle forward end 26. The inlet structure 30 is configured to direct a stream of air through an inlet opening 36 (see also FIG. 2) at the nacelle forward end 26 and into a fan section of the gas turbine engine.

The fan cowls 32 are disposed axially between the inlet structure 30 and the aft structure 34. Each fan cowl 32 of FIG. 1, in particular, is disposed at an aft end 38 of a stationary portion of the nacelle 22. Each fan cowl 32 extends axially forward to the inlet structure 30. Each fan cowl 32 is generally axially aligned with a fan section of the gas turbine engine. The fan cowls 32 are configured to provide an aerodynamic covering for a fan case 40; see FIG. 2. Briefly, this fan case 40 circumscribes an array of fan blades in the fan section, and is configured to radially contain one or more of the fan blades and/or fan blade fragments where the blade(s) and/or blade fragment(s) are radially ejected from the fan rotor, for example, after collision with a foreign object. The fan case 40 is also configured to partially form a forward outer peripheral boundary of a bypass flowpath of the propulsion system 20 aft of the fan rotor.

Referring still to FIG. 1, the term "stationary portion" is used above to describe a portion of the nacelle 22 that is stationary during propulsion system 20 operation (e.g., during takeoff, aircraft flight and landing). However, the stationary portion may be otherwise movable for propulsion system 20 inspection/maintenance; e.g., when the propulsion system 20 is non-operational. Each of the fan cowls 32, for example, may be configured to provide access to components of the gas turbine engine such as the fan case 40 (see FIG. 2) and/or peripheral equipment configured therewith for inspection, maintenance and/or otherwise. In particular, each of fan cowls 32 may be pivotally mounted with the aircraft propulsion system 20 by, for example, a pivoting hinge system. The present disclosure, of course, is not limited to the foregoing exemplary fan cowl configuration and/or access scheme.

The aft structure 34 may include a translating sleeve 42 for the thrust reverser system. The translating sleeve 42 of FIG. 1 is disposed at the nacelle aft end 28. This translating sleeve 42 extends axially along the axial centerline 24 from a forward end thereof towards (or to) the nacelle aft end 28. The translating sleeve 42 is configured to partially form an aft outer peripheral boundary of the bypass flowpath. The translating sleeve 42 may also be configured to form a bypass nozzle 44 for the bypass flowpath with an inner structure 46 of the nacelle 22 (e.g., an inner fixed structure (IFS)), which nacelle inner structure 46 houses a core of the gas turbine engine.

Figure 2:
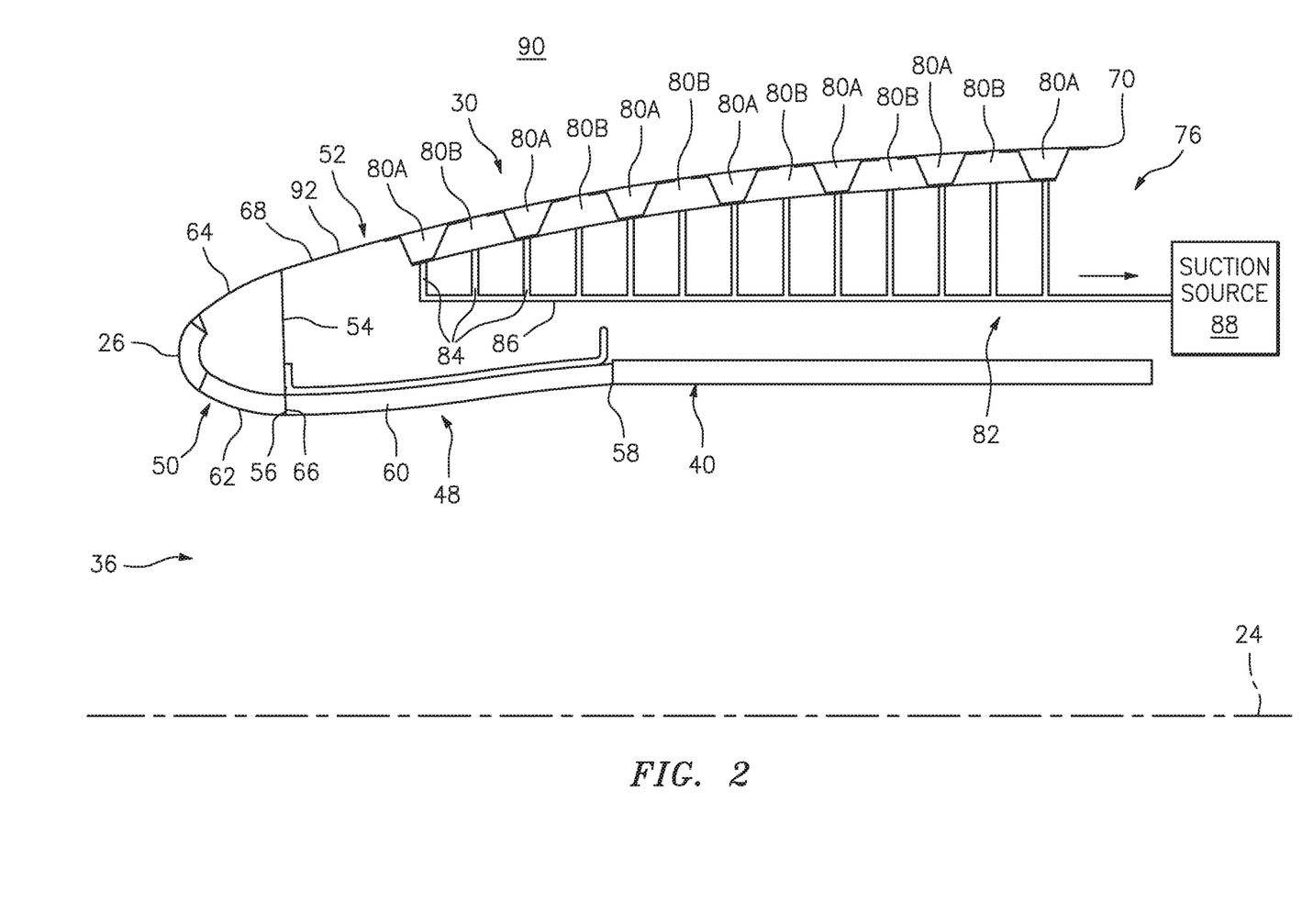
FIG. 2 is a schematic side sectional illustration of a forward portion of the aircraft propulsion system of FIG. 1, in accordance with various embodiments.

Referring now to FIG. 2, the inlet structure 30 may include a tubular inner barrel 48, an annular inlet lip 50, a tubular outer barrel 52 and a bulkhead 54. The inner barrel 48 extends circumferentially around the centerline 24. The inner barrel 48 extends axially along the centerline 24 between an inner barrel forward end 56 and an inner barrel aft end 58, which aft end 58 is positioned axially adjacent and may be connected to a forward end of the fan case 40.

The inner barrel 48 may be configured to attenuate noise generated during propulsion system 20 operation and, more particularly for example, noise generated by rotation of the fan rotor. The inner barrel 48, for example, may include at least one tubular acoustic panel or an array of arcuate acoustic panels 60 (see FIG. 3) arranged around the centerline 24. Each acoustic panel 60 may include a porous (e.g., honeycomb) core bonded between a perforated face sheet and a non-perforated back sheet, where the perforated face sheet faces radially inward and provides an outer boundary for an axial portion of the gas path. Of course, various other acoustic panel types and configurations are known in the art, and the present disclosure is not limited to any particular ones thereof.

The inlet lip 50 forms a leading edge of the nacelle 22 as well as the inlet opening 36. The inlet lip 50 has a cupped (e.g., a generally U-shaped or V-shaped) cross-sectional geometry which extends circumferentially around the centerline 24. The inlet lip 50 includes axially overlapping inner and outer lip portions 62 and 64.

The inner lip portion 62 extends axially from the outer lip portion 64 at the nacelle forward end 26 and the inlet opening 36 to the inner barrel 48. An aft end 66 of the inner lip portion 62 is attached to the inner barrel forward end 56 with, for example, one or more fasteners; e.g., rivets, bolts, etc. The inner lip portion 62 may also or alternatively be bonded (e.g., welded, brazed, adhered, etc.) to the inner barrel 48. Of course, the present disclosure is not limited to any particular attachment techniques between the inlet lip 50 and the inner barrel 48.

The outer lip portion 64 extends axially from the inner lip portion 62 at the nacelle forward end 26 to the outer barrel 52. The outer lip portion 64 and, more particular, the entire inlet lip 50 may be formed integral with the outer barrel 52. The inlet lip 50 and the outer barrel 52, for example, may be formed from at least a monolithic outer skin 68 such as a formed sheet of molded composite material; e.g., fiber reinforcement within a polymer (e.g., thermoset or thermoplastic resin) matrix. Such a monolithic outer skin 68 may extend longitudinally from the aft end 66 of the inner lip portion 62 to an aft end 70 of the outer barrel 52.

Figure 3:
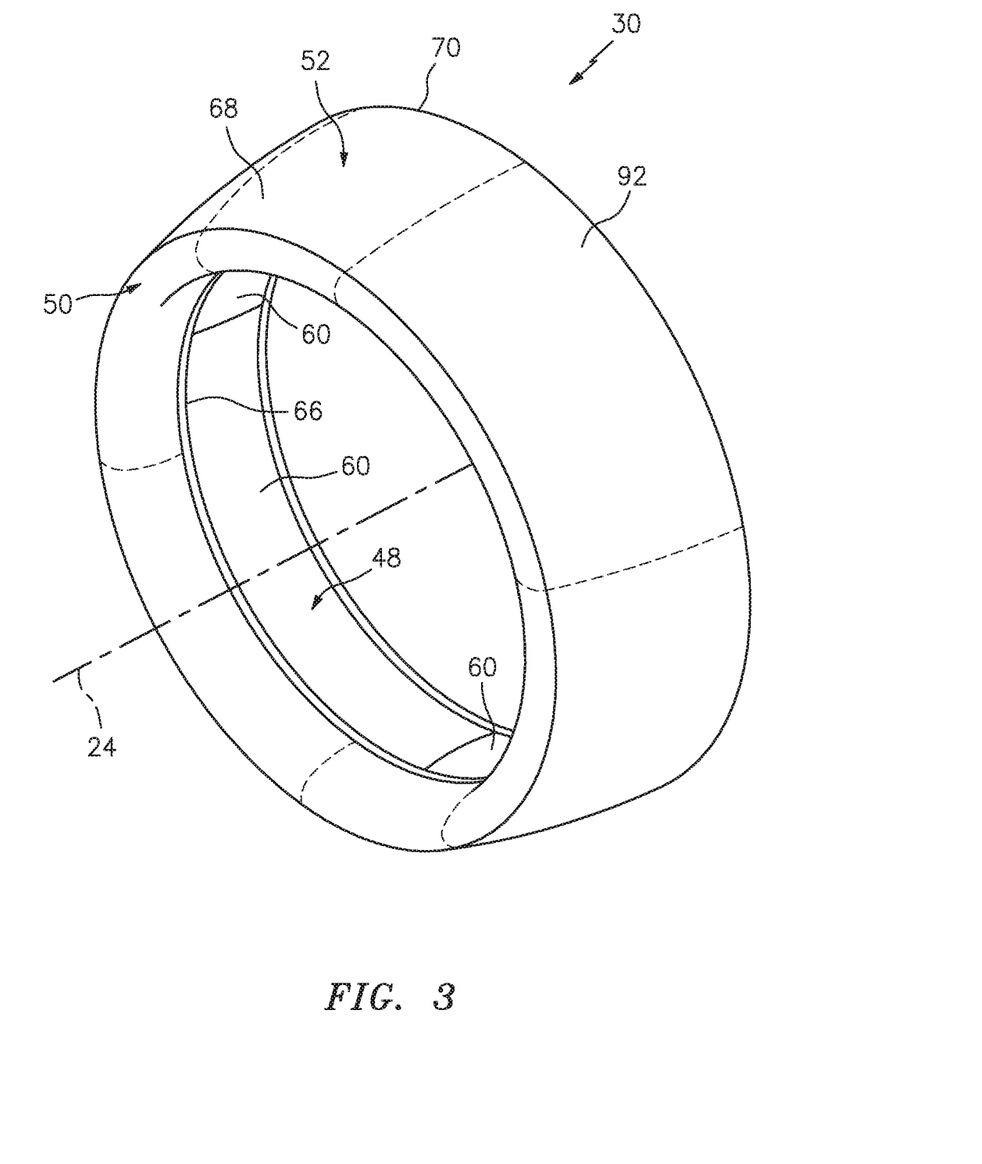
FIG. 3 is a perspective illustration of an inlet structure for the aircraft propulsion system of FIG. 1, in accordance with various embodiments.
Figure 4:
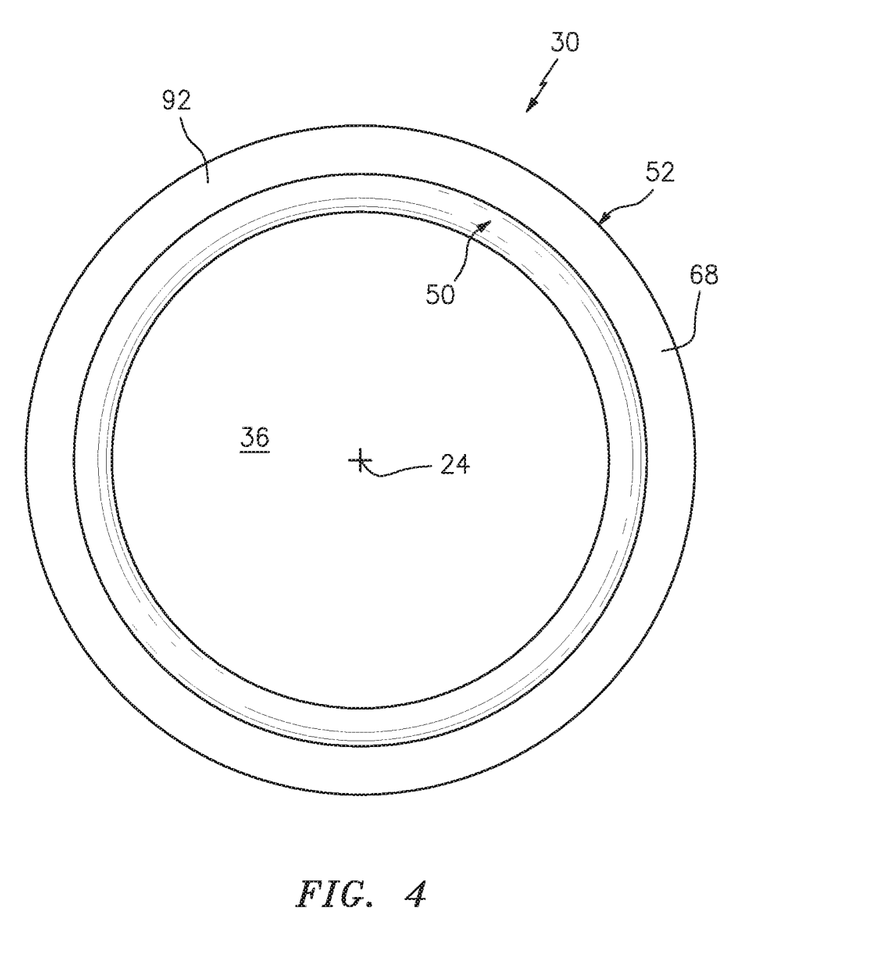
FIG. 4 is an end view illustration of the inlet structure of FIG. 3, in accordance with various embodiments.
Figure 5:
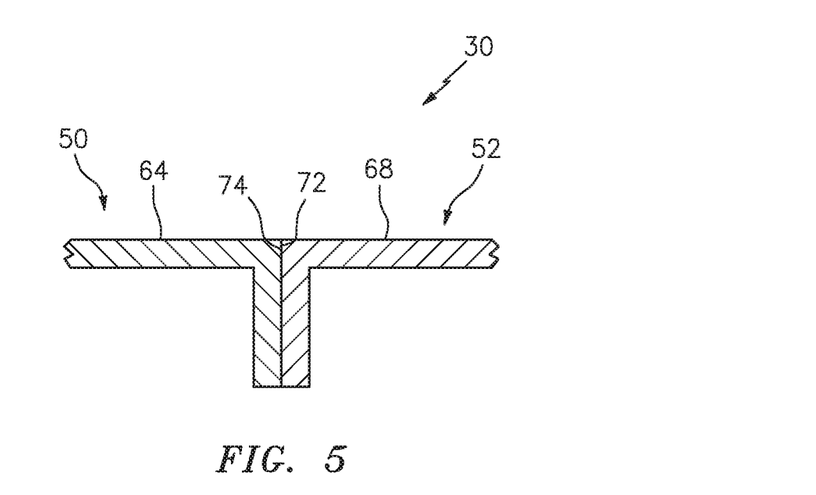
FIG. 5 is a sectional illustration of a joint between an inlet lip and an outer barrel of another inlet structure for the aircraft propulsion system of FIG. 1, in accordance with various embodiments.

The inlet lip 50 and the outer barrel 52 may be configured as a single monolithic full hoop body as shown in FIGS. 3 and 4. Alternatively, the inlet lip 50 and the outer barrel 52 may be formed from an array of arcuate segments (e.g., with edges that may correspond to the dashed contour lines shown in FIG. 3) that are attached side-to-side circumferentially about the centerline 24. Of course, in other embodiments, the inlet lip 50 may be formed discrete from the outer barrel 52 as shown in FIG. 5. In such an embodiment, an aft end 72 of the outer lip portion 64 is attached (e.g., mechanically fastened and/or bonded) to a forward end 74 of the outer barrel 52.

Referring again to FIGS. 2 and 3, the outer barrel 52 extends circumferentially around the centerline 24. Referring to FIG. 2, the outer barrel 52 extends axially along the centerline 24 between the inlet lip 50 and, more particularly, the outer lip portion 64 and the outer barrel aft end 70. The outer barrel 52 may be sized to axially project aft away from the inner barrel 48 and thereby axially cover at least a forward portion of the fan case 40.

The bulkhead 54 is located approximately axially at (e.g., proximate, adjacent or on) the aft end 66 of the inlet lip 50. The bulkhead 54 may be configured as a substantially annular body. The bulkhead 54 is attached to and extends radially between the inner lip portion 62 and the outer lip portion 64. The bulkhead 54 may be formed integral with the inlet lip 50; e.g., at least the nacelle components 50, 52 and 54 may be configured as a single monolithic body. Alternatively, the bulkhead 54 may be formed discrete from the inlet lip 50 and then mechanically fastened, bonded or otherwise attached to the inlet lip 50.

The inlet structure 30 of FIGS. 1 and 2 is further configured with an active laminar flow control (ALFC) system 76. This ALFC system 76 includes a plurality of perforations 78 (e.g., see FIGS. 1, 8, 10 and 11; not shown in FIGS. 2-4 and 6 for ease of illustration), a plurality of plenums 80A and 80B (generally referred to as "80") and a suction system 82. The exemplary suction system 82 of FIG. 2 includes a plurality of conduits 84, a manifold 86 and a suction source 88; e.g., a vacuum pump. The present disclosure, however, is not limited to any particular suction system configuration. For example, in other embodiments, the suction system 82 may include one or more manifolds and/or one or more suction sources.

Figure 8:
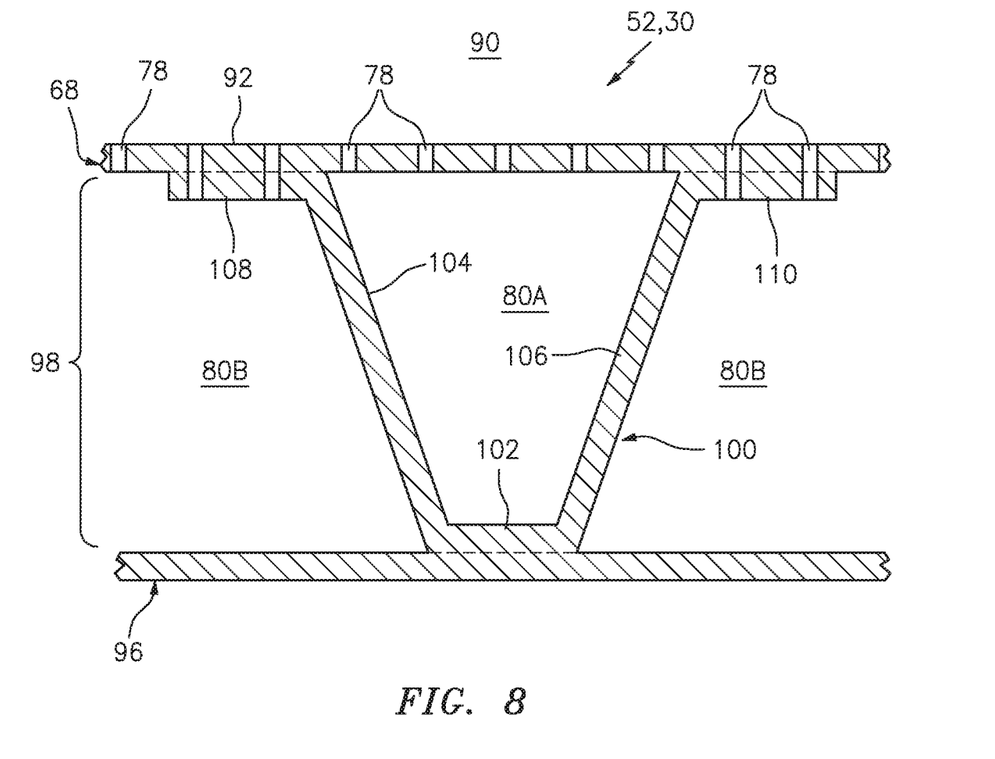
FIG. 8 is an enlarged sectional illustration of a portion of the panel of FIG. 6, in accordance with various embodiments.

The perforations 78 are arranged in and extend completely through the outer skin 68; see FIG. 8. Each of the plenums 80 is fluidly coupled with a respective array of perforations 78 in the outer skin 68. The plenums 80 are thereby fluidly coupled with an external, outside environment 90 to the nacelle 22 and the propulsion system 20 through the respective perforations 78. The conduits 84 respectively fluidly couple the plenums 80 to the manifold 86, which manifold 86 in turn fluidly couples the conduits 84 to the suction source 88. With this arrangement, the ALFC system 76 is adapted to direct (e.g., pull) boundary layer air flowing along the outer skin 68 in the environment 90 sequentially through the ALFC system elements 78, 80, 84 and 86 to the suction source 88, whereby pulling the boundary layer air into the perforations 78 may aid in facilitating laminar flow along the along an outer surface 92 of the inlet structure 30. The general principals of active laminar flow control are well known and therefore are not described herein in further detail.

Figure 6:
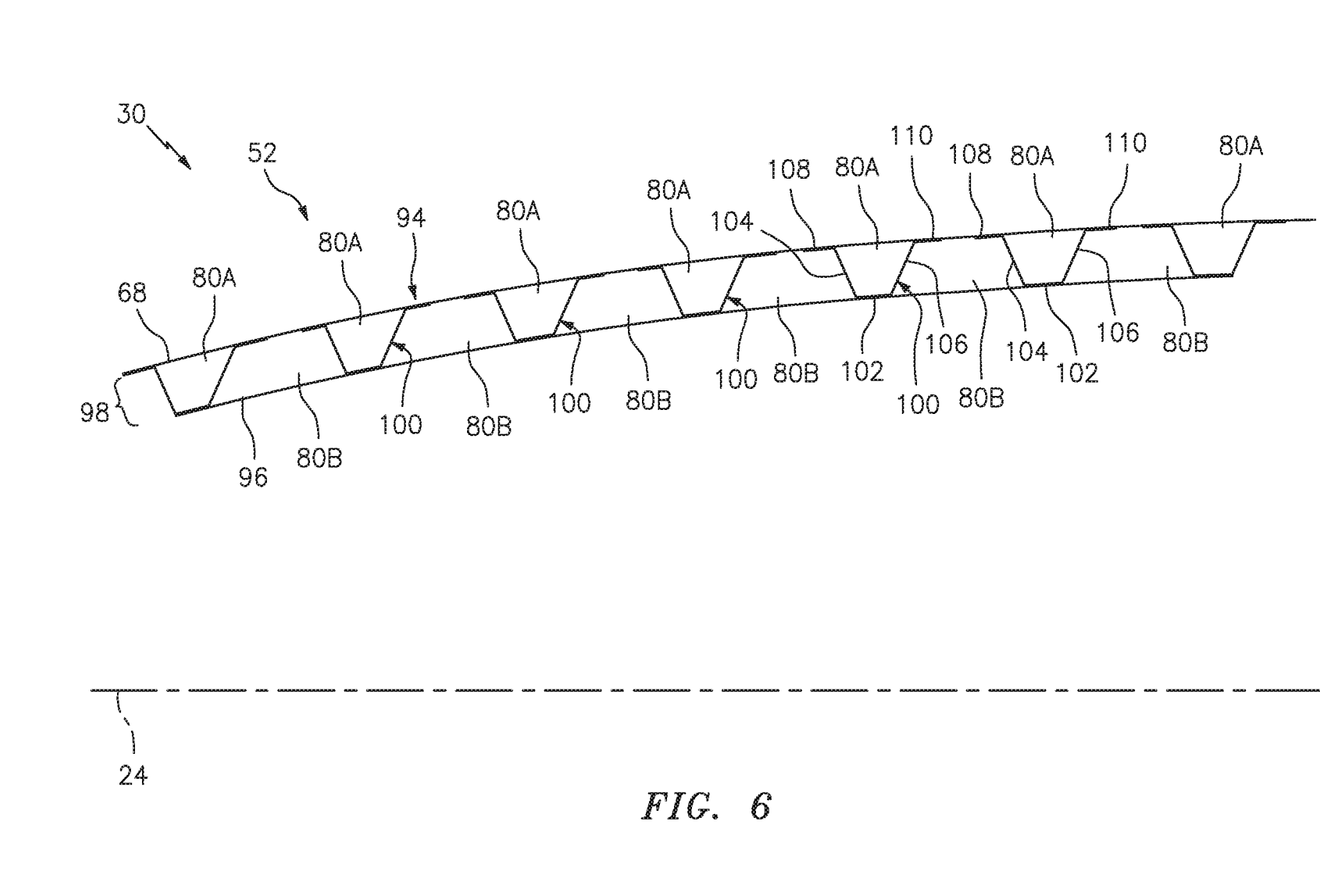
FIG. 6 is a sectional illustration of a panel configured for an outer barrel, in accordance with various embodiments.

Referring to FIG. 6, the plenums 80 are integrated into/embedded within one or more panels 94 (see also FIG. 1). Each of these panels 94 may be configured as an integral portion of the inlet structure 30 and, more particularly, the outer barrel 52. The panel 94 of FIG. 6, for example, includes a respective portion of the outer skin 68 (here a radial outer skin), a respective portion of an inner skin 96 (here a radial inner skin) and a corrugated core section 98, which extends and is connected between the outer skin 68 and the inner skin 96.

The corrugated core section 98 of FIG. 6 includes a plurality of axially side-by-side corrugations 100. Each of these corrugations 100 may be configured as a longitudinally (e.g., circumferentially relative to the centerline 24) elongated hollow-hat channel structure; see also FIG. 7. The exemplary corrugation 100 of FIG. 8, for example, includes a bridge 102, a first sidewall 104, a second sidewall 106, a first flange 108 and a second flange 110. The bridge 102 extends laterally (e.g., generally axially relative to the centerline 24) between the first sidewall 104 and the second sidewall 106. The bridge 102 of FIG. 8 may lay flush against and is connected (e.g., directly) to the inner skin 96. The first sidewall 104 extends vertically (e.g., generally radially relative to the centerline 24) and laterally between an end of the bridge 102 and an end of the first flange 108 as well as between the inner skin 96 and the outer skin 68. Similarly, the second sidewall 106 extends vertically and laterally between an end of the bridge 102 and an end of the second flange 110 as well as between the inner skin 96 and the outer skin 68. The first flange 108 projects laterally out from the first sidewall 104 to a distal end, which forms a first side of the corrugation 100. The first flange 108 of FIG. 8 may lay flush against and is connected (e.g., bonded directly) to the outer skin 68. The second flange 110 projects laterally out from the second sidewall 106 to a distal end, which forms a second side of the corrugation 100. The second flange 110 of FIG. 8 may lay flush against and is connected (e.g., bonded directly) to the outer skin 68.

Figure 9:
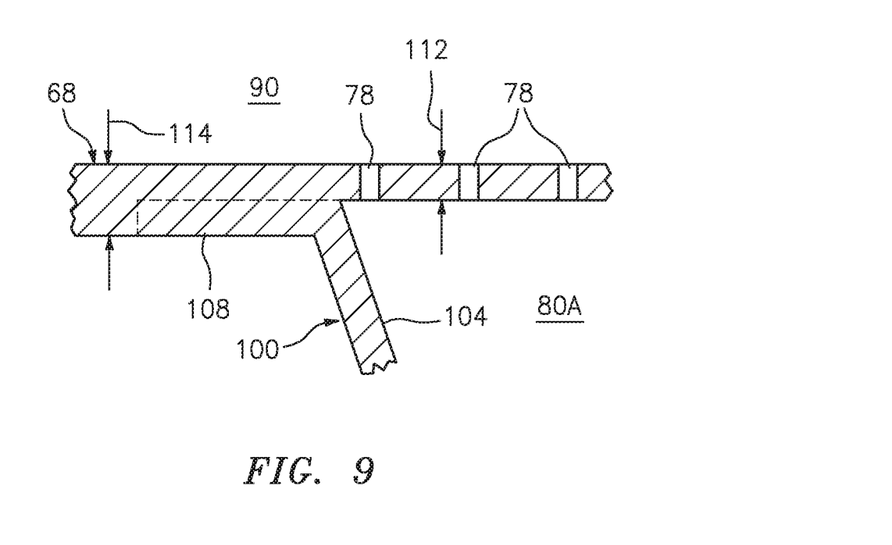
FIG. 9 is an enlarged sectional illustration of a portion of another panel configured for an outer barrel, in accordance with various embodiments.

With the foregoing configuration, the corrugations 100 along with the inner skin 96 are operable to provide a reinforcement/backbone structure for the outer skin 68. As a result, a vertical thickness of the outer skin 68 may be sized smaller than if the corrugations 100 and inner skin 96 were not provided. This may enable the vertical thickness of the entire outer skin 68 to be decreased. Alternatively, the vertical thickness at 112 of a portion of the outer skin 68 connected to the corrugations 100 may be sized less than the vertical thickness at 114 of an adjacent (e.g., unsupported) portion of the outer skin 68 as shown in FIG. 9. As a result, an overall weight of the inlet structure 30 may be reduced.

Figure 7:
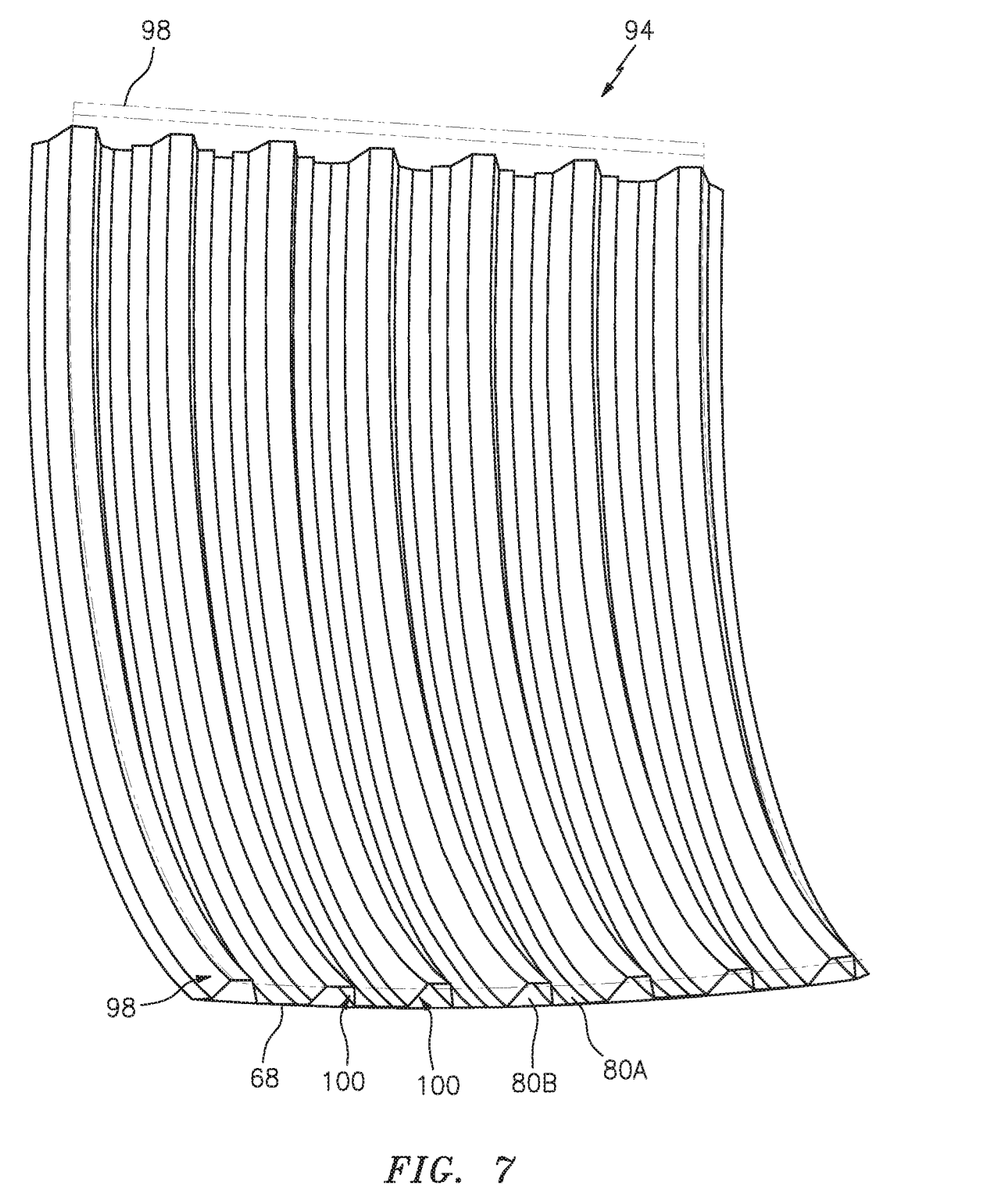
FIG. 7 is a perspective illustration of an arcuate section of the panel of FIG. 6, in accordance with various embodiments.

Referring to FIG. 6, the plenums 80 may be grouped into one or more first plenums 80A and one or more second plenums 80B. Each first plenum 80A is arranged within the panel 94 vertically between the outer skin 68 and the inner skin 96. More particularly, each first plenum 80A extends vertically between a respective bridge 102 and the outer skin 68; see also FIG. 8. Each first plenum 80A extends laterally between the first and the second sidewalls 104 and 106 of a respective one of the corrugations 100. Referring to FIG. 7, each first plenum 80A extends longitudinally within the panel 94, where a longitudinal length of each first plenum 80A may be significantly (e.g., 10×, 20×, 30× or more) greater than a lateral length and/or vertical height of that first plenum 80A.

Referring to FIG. 6, each second plenum 80B is arranged within the panel 94 vertically between the outer skin 68 and the inner skin 96. More particularly, each second plenum 80B extends vertically between the inner skin 96, the outer skin 68 and respective flanges of two laterally adjacent corrugations 100. Each second plenum 80B extends laterally between the first and the second sidewalls 104 and 106 of the two laterally adjacent corrugations 100. Referring to FIG. 7, each second plenum 80B extends longitudinally within the panel 94, where a longitudinal length of each second plenum 80B may be significantly (e.g., 10×, 20×, 30× or more) greater than a lateral length and/or vertical height of that second plenum 80B. It is worth noting, at least some of the perforations 78 fluidly coupled with each second plenum 80B may also extend completely through the respective flanges 108 and 110 as shown in FIG. 8. However, the present disclosure is not limited to such an embodiment. For example, in other embodiments, one or more of the flanges 108 and/or 110 may be non-perforated.

The panel 94 of FIGS. 6 and 7 and, more generally, the inlet structure 30 and each of its elements may be configured from composite material; e.g., fiber-reinforced composite material. This composite material may include reinforcement fibers embedded within a polymer matrix; e.g., thermoset or thermoplastic resin. Examples of reinforcement fibers include, but are not limited to, fiberglass fibers, carbon-fiber fibers, aramid (e.g., Kevlar®) fibers and/or a combination thereof.

In some embodiments, each panel 94 as well as the outer barrel 52 and/or the inlet structure 30 as a whole may be configured from the composite material as a monolithic body. The reinforcement fibers, for example, may be laid up in a mold collectively in the shape of the panel 94 in its entirety. The reinforcement fibers may then be impregnated with resin. Of course, in other embodiments, the reinforcement fibers may also or alternatively be pre-impregnated before the layup. The resin in the laid-up material may subsequently be cured such that the various elements (e.g., 68, 96, 98 and 100) of the entire panel 94 are co-cured together during a single curing cycle to form the panel 94 body. Subsequent to this curing cycle, the outer skin 68 and, as needed, one or more of the flanges 108 and/or 110 are perforated to form the perforations 78. This perforation process may be performed using a laser, a mechanical drill and/or any other suitable material perforation device.

In some embodiments, one or more elements (e.g., 68, 96 and/or 100) of a panel may be formed using different curing cycles. For example, a first body corresponding to the outer skin 68 may be laid-up, impregnated and then cured during a first curing cycle. A second body corresponding to the corrugated core section 98 and one or more of its corrugations 100 may be laid-up, impregnated and then cured during a second curing cycle. A third body corresponding to the inner skin 96 may be laid-up, impregnated and then cured during a third curing cycle. These three bodies may subsequently be adhered with resin and/or otherwise bonded together to form the panel 94 body. Subsequent to this bonding, the outer skin 68 and, as needed, one or more of the flanges 108 and/or 110 are perforated to form the perforations 78. Alternatively, the outer skin 68 may be perforated prior to the bonding; however, some of these perforations 78 may be covered/blocked by the flanges 108 and/or 110. As a result, an additional perforating process may (or may not) be performed to perforate the flanges 108 and/or 110.

While three different lay-up and curing steps are described above, the present disclosure is not limited to such a formation methodology. For example, in other embodiments, a method for manufacturing the panel 94 may combine the laying-up and co-curing of the elements 68 and 98/100 or the elements 96 and 98/100.

Figure 10:
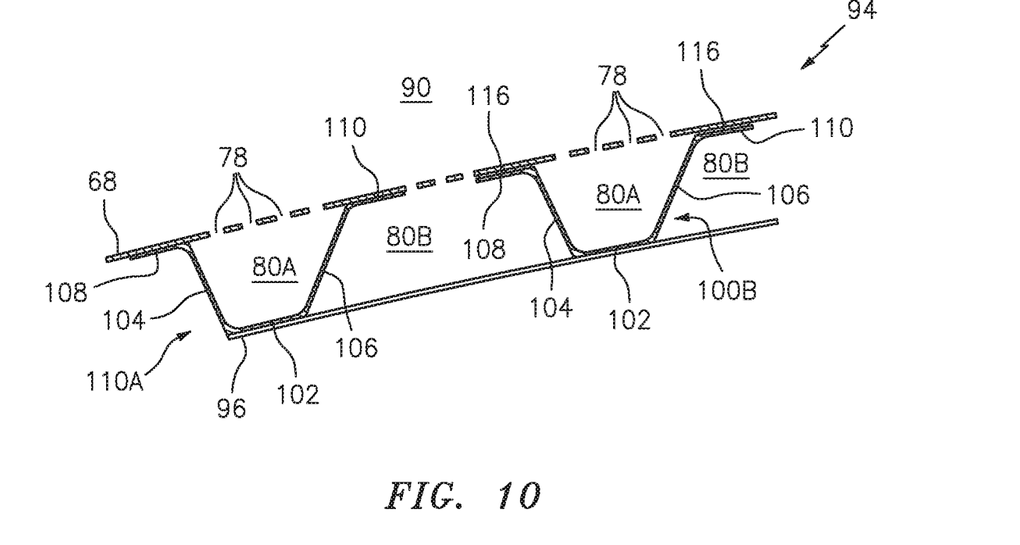
FIGS. 10-12 are sectional illustrations of respective portions of other panels configured for an outer barrel, in accordance with various embodiments.
Figure 11:
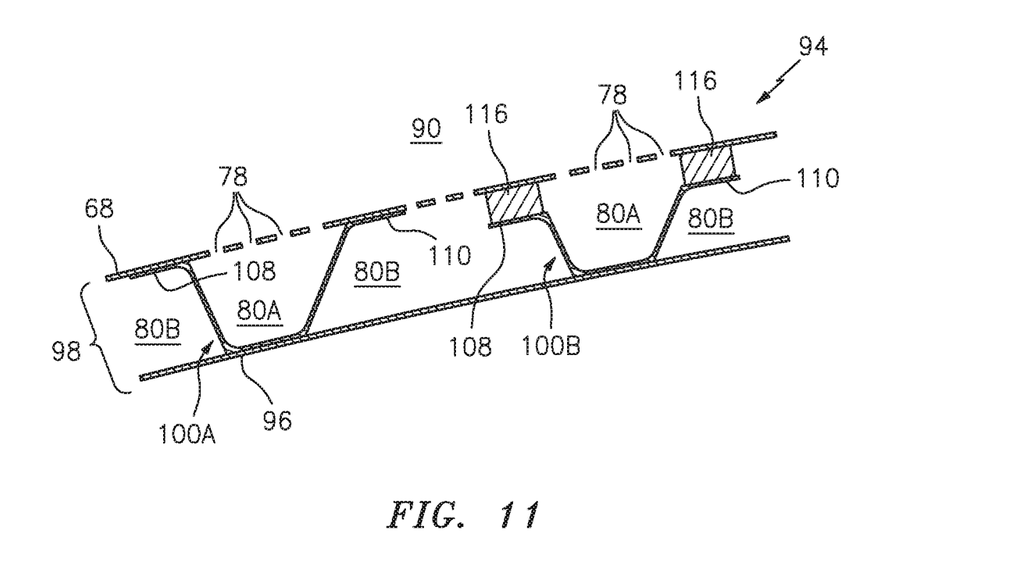

In some embodiments, the panel 94 may be configured with one or more spacers 116 as illustrated, for example, in FIGS. 10 and 11. Such spacers 116 may be used to compensate for irregularities/manufacturing tolerances in the corrugated core section 98. For example, during manufacture, one of the corrugations 100A may have a (e.g., slightly) different vertical height than another one of the corrugations 100B. The spacers 116 may be bonded between the smaller/shorter corrugation 100B (e.g., one or both of its flanges 108 and/or 110) and the outer skin 68 such that the vertical distance between the skins 68 and 96 at the non-spaced corrugation 100A is the same as (or alternatively different than) the vertical distance between the skins 68 and 96 at the spaced corrugation 100B. Thus, the spaced corrugation 100B is connected (e.g., bonded indirectly) to the outer skin 68 through the spacers 116. In the embodiment of FIG. 10, the spacer 116 (or shim) is configured with the vertical thickness that is equal to or less than the vertical thicknesses of the outer skin 68 and/or the flanges 108 and/or 110. In the embodiment of FIG. 11, the spacer 116 is configured with the vertical thickness that is (e.g., at least 2-5×) greater than the vertical thicknesses of the outer skin 68 and/or the flanges 108 and/or 110.

Figure 12:
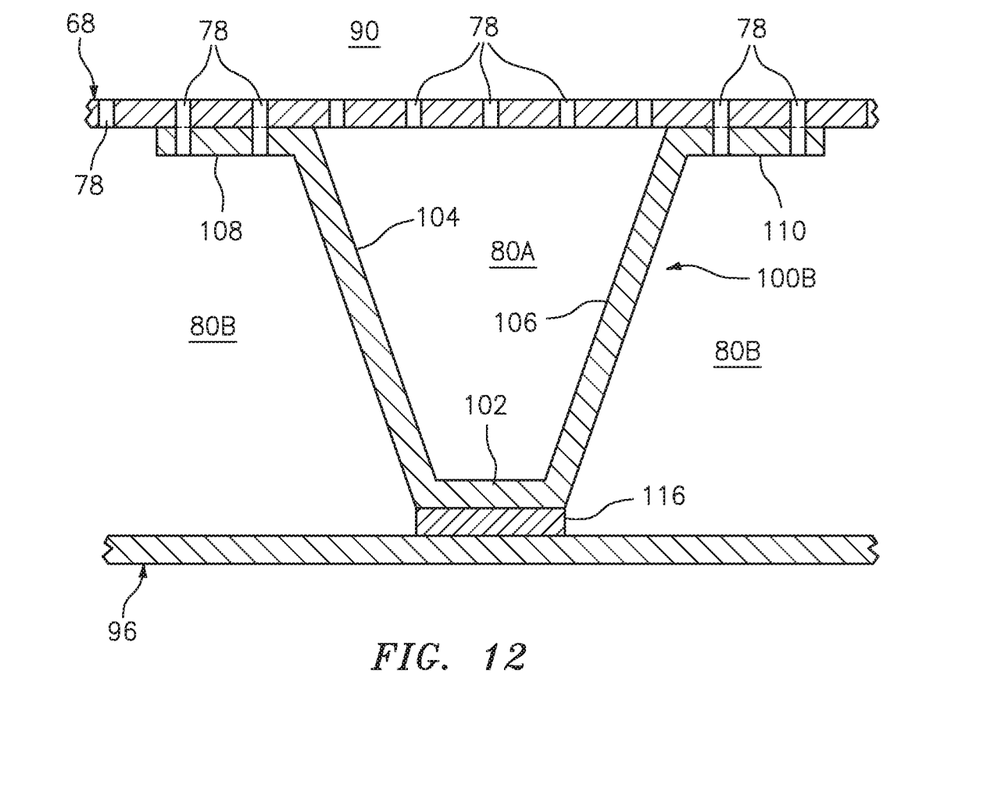

In some embodiments, one or more spacers 116 may also or alternatively be bonded between a respective corrugation 100 (e.g., its bridge 102) and the inner skin 96 as shown in FIG. 12.

The panels 94 are described above as being integral portions of the outer barrel 52 and the inlet structure 30; e.g., sharing a common outer skin and a common inner skin. However, in other embodiments, each panel 94 may be configured with a discrete inner skin. In still other embodiments, each panel 94 may be configured with a discrete outer skin.

The ALFC system 76 is described above as being configured with the aircraft propulsion system 20. However, the present disclosure is not limited to aircraft propulsion system applications. For example, in other embodiments, the ALFC system 76 may be configured for promoting laminar flow along a surface of a wing or any other component of an aircraft. In still other embodiments, the ALFC system 76 may be configured with other non-aircraft vehicles. The present disclosure therefore is not limited to propulsion system or aircraft applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for active laminar flow control, comprising:
   a panel comprising an outer skin, an inner skin, a core section and a plurality of plenums;
   the core section extending between and connected to the outer skin and the inner skin, and the core section comprising a first sidewall;
   the plurality of plenums between the outer skin and the inner skin, each of the plurality of plenums fluidly coupled with a respective array of perforations through the outer skin, and a laterally adjacent pair of the plurality of plenums laterally separated by and partially formed by the first sidewall; and
   the panel constructed from fiber-reinforced composite material;
   wherein the core section further comprises a plurality of corrugations arranged between the outer skin and the inner skin;
   wherein a first of the plurality of corrugations comprises a bridge, the first sidewall, a second sidewall, a first flange and a second flange; and
   wherein a first perforation in the respective array of perforations extends through the outer skin and the first flange.

2. The assembly of claim 1, further comprising a suction system fluidly coupled with one or more of the plurality of plenums.

3. The assembly of claim 1, wherein the panel is configured from the fiber-reinforced composite material as a monolithic body.

4. The assembly of claim 1, wherein
   the plurality of corrugations form sidewalls of the plurality of plenums; and
   one of the sidewalls of the plurality of plenums is the first sidewall.

5. The assembly of claim 4, wherein
   the bridge extends between the first sidewall and the second sidewall, and is connected to the inner skin;
   the first sidewall and the second sidewall each extend between the inner skin and the outer skin;
   the first flange projects out from the first sidewall and is connected to the outer skin; and
   the second flange projects out from the second sidewall and is connected to the outer skin.

6. The assembly of claim 4, wherein a first of the plurality of corrugations is bonded to at least one of the outer skin and the inner skin.

7. The assembly of claim 4, wherein
   the panel further comprises a spacer;
   a first of the plurality of corrugations is connected directly to the outer skin; and
   a second of the plurality of corrugations is connected indirectly to the outer skin through the spacer.

8. The assembly of claim 7, wherein a first distance between the outer skin and the inner skin at the first of the plurality of corrugations is equal to a second distance between the outer skin and the inner skin at the second of the plurality of corrugations.

9. The assembly of claim 4, wherein
   the panel further comprises a spacer;
   a first of the plurality of corrugations is connected directly to the inner skin; and
   a second of the plurality of corrugations is connected indirectly to the inner skin through the spacer.

10. The assembly of claim 1, wherein a first portion of the outer skin has a first thickness, and a second portion of the outer skin has a second thickness that is different from the first thickness.

11. The assembly of claim 1, further comprising a nacelle for an aircraft propulsion system, wherein the nacelle comprises the panel.

12. An assembly for active laminar flow control, comprising:
    a panel comprising an outer skin, an inner skin, a plurality of corrugations and a plurality of plenums, the panel constructed from fiber-reinforced composite material;
    the plurality of corrugations arranged between the outer skin and the inner skin;
    the plurality of plenums between the outer skin and the inner skin, each of the plurality of plenums fluidly coupled with a respective array of perforations through the outer skin;
    a first of the plurality of corrugations comprising a bridge, a first sidewall, a second sidewall, a first flange and a second flange;
    the bridge extending between the first sidewall and the second sidewall, and the bridge connected to the inner skin;
    the first sidewall and the second sidewall each extending between the inner skin and the outer skin, the first sidewall laterally between and partially forming a first of the plurality of plenums and a second of the plurality of plenums;
    the first flange projecting out from the first sidewall and connected to the outer skin; and
    the second flange projecting out from the second sidewall and connected to the outer skin;
    wherein a first perforation in the respective array of perforations extends through the outer skin and the first flange; and
    wherein the first perforation is fluidly coupled with the first of the plurality of plenums.

13. The assembly of claim 12, wherein the second sidewall is laterally between and partially forms the second of the plurality of plenums and a third of the plurality of plenums.

14. An assembly for active laminar flow control, comprising:
    a panel comprising an outer skin, an inner skin, a plurality of corrugations and a plurality of plenums, the panel constructed from fiber-reinforced composite material;
    the plurality of corrugations arranged between the outer skin and the inner skin;
    the plurality of plenums between the outer skin and the inner skin, each of the plurality of plenums fluidly coupled with a respective array of perforations through the outer skin;
    a first of the plurality of corrugations comprising a bridge, a first sidewall, a second sidewall, a first flange and a second flange;
    the bridge extending between the first sidewall and the second sidewall, and the bridge connected to the inner skin;
    the first sidewall and the second sidewall each extending between the inner skin and the outer skin;
    the first flange projecting out from the first sidewall and connected to the outer skin, wherein a first perforation extends through the outer skin and the first flange to a first of the plurality of plenums; and
    the second flange projecting out from the second sidewall and connected to the outer skin.

15. The assembly of claim 14, wherein a second perforation extends through the outer skin to a second of the plurality of plenums.

16. The assembly of claim 15, wherein the first sidewall is laterally between and partially forms the first of the plurality of plenums and the second of the plurality of plenums.

17. The assembly of claim 15, wherein a third perforation extends through the outer skin and the second flange to a third of the plurality of plenums.

\* \* \* \* \*